United States Patent
Hamabe (10) Patent No.: US 11,230,934 B2
(45) Date of Patent: Jan. 25, 2022

(54) AIRFOIL OF AXIAL FLOW MACHINE

(71) Applicant: IHI Corporation, Koto-ku (JP)

(72) Inventor: Masaaki Hamabe, Tokyo (JP)

(73) Assignee: IHI Corporation, Koto-ku (JP)

( * ) Notice: Subject to any disclaimer, the term of this patent is extended or adjusted under 35 U.S.C. 154(b) by 198 days.

(21) Appl. No.: 16/452,848

(22) Filed: Jun. 26, 2019

(65) Prior Publication Data

US 2019/0338659 A1 Nov. 7, 2019

Related U.S. Application Data

(63) Continuation of application No. PCT/JP2018/003440, filed on Feb. 1, 2018.

(30) Foreign Application Priority Data

Feb. 7, 2017 (JP) .............................. JP2017-020578

(51) Int. Cl.
*F01D 9/02* (2006.01)
*F01D 5/14* (2006.01)

(52) U.S. Cl.
CPC ................. *F01D 9/02* (2013.01); *F01D 5/14* (2013.01); *F05D 2240/12* (2013.01); *F05D 2250/71* (2013.01); *F05D 2260/941* (2013.01)

(58) Field of Classification Search
CPC ... F01D 9/02; F01D 5/14; F01D 5/145; F01D 9/041; F01D 5/141; F01D 5/143;
(Continued)

(56) References Cited

U.S. PATENT DOCUMENTS 4,465,433 A * 8/1984 Bischoff ................. F01D 5/141
  415/181
6,181,978 B1 * 1/2001 Hinds ...................... G06T 17/20
  700/182

(Continued)

FOREIGN PATENT DOCUMENTS

EP  3 022 400       5/2016
JP  5-44691         2/1993
(Continued)

OTHER PUBLICATIONS

International Search Report dated Apr. 24, 2018 in PCT/JP2018/003440 filed on Feb. 1, 2018 (with English translation).
(Continued)

*Primary Examiner* — J. Todd Newton
(74) *Attorney, Agent, or Firm* — Oblon, McClelland, Maier & Neustadt, L.L.P.

(57) ABSTRACT

An airfoil of an axial flow machine includes an airfoil part that has a suction surface and a pressure surface, an endwall as a shroud or a platform, and a fillet that is provided along a connecting portion between the airfoil part and the endwall. The fillet includes a first curved surface formed at least on a leading edge side and a trailing edge side in the airfoil part on the suction surface side and a second curved surface formed in a portion other than a portion where the first curved surface is formed. The second curved surface has a smaller curvature radius than the first curved surface.

19 Claims, 4 Drawing Sheets

(58) Field of Classification Search
CPC ............ F05D 2240/12; F05D 2250/71; F05D 2260/941; F05D 2240/80; Y02T 50/60
USPC .......................................................... 416/192
See application file for complete search history.

(56) References Cited

U.S. PATENT DOCUMENTS

| | | | | |
|---|---|---|---|---|
| 6,478,539 | B1* | 11/2002 | Trutschel | F01D 5/143 415/223 |
| 7,249,933 | B2 | 7/2007 | Lee et al. | |
| 7,625,181 | B2* | 12/2009 | Matsuda | F01D 5/143 416/193 A |
| 10,436,044 | B2* | 10/2019 | Schlemmer | F01D 9/041 |
| 2006/0275112 | A1* | 12/2006 | Lee | F01D 5/143 415/191 |
| 2009/0246032 | A1* | 10/2009 | Stone | B23C 5/1009 416/223 R |
| 2010/0284815 | A1* | 11/2010 | Parker | F01D 5/14 416/223 A |
| 2011/0097210 | A1 | 4/2011 | Kirtley | |
| 2014/0154079 | A1 | 6/2014 | Chouhan et al. | |
| 2015/0110616 | A1 | 4/2015 | Stein et al. | |
| 2015/0285085 | A1* | 10/2015 | Bentley | F01D 9/02 415/208.1 |
| 2016/0123166 | A1 | 5/2016 | Ols et al. | |
| 2017/0009587 | A1* | 1/2017 | Szymanski | F01D 5/141 |

FOREIGN PATENT DOCUMENTS

| | | | | |
|---|---|---|---|---|
| JP | 2004-278517 | A | 10/2004 | |
| JP | 2006-342804 | | 12/2006 | |
| JP | 2010-196625 | | 9/2010 | |
| JP | 2011-74837 | A | 4/2011 | |
| JP | 2011-89518 | | 5/2011 | |
| JP | 2014-109273 | | 6/2014 | |
| JP | 2015-81601 | | 4/2015 | |
| JP | 2016-527431 | | 9/2016 | |
| WO | WO-2010054950 | A1* | 5/2010 | ............. F01D 5/143 |
| WO | WO-2014113043 | A1* | 7/2014 | ............. F01D 5/147 |

OTHER PUBLICATIONS

Written Opinion dated Apr. 24, 2018 in PCT/JP2018/003440 filed on Feb. 1, 2018.
Extended European Search Report dated May 11, 2020 in corresponding European Patent Application No. 18751871.7, 9 pages.
Japanese Office Action dated Mar. 24, 2020 in Japanese Patent Application No. 2018-587394, 2 pages.

* cited by examiner

AIRFOIL OF AXIAL FLOW MACHINE

CROSS REFERENCE TO RELATED APPLICATIONS

This application is a continuation application of International Application No. PCT/JP2018/003440, now WO2018/147162, filed on Feb. 1, 2018, which claims priority to Japanese Patent Application No. 2017-020578, filed on Feb. 7, 2017, the entire contents of which are incorporated by reference herein.

BACKGROUND

1. Technical Field

The present disclosure relates to an airfoil of an axial flow machine that operates as an axial flow compressor or turbine.

2. Description of the Related Art

An axial flow machine includes a cascade of rotor blades and a cascade of stator vanes. The rotor blades and the stator vanes are alternately arranged in an axial direction. An endwall is provided at a radially inward side and a radially outward side of each cascade, and forms a flow path for fluid flowing through the axial flow machine, together with the cascade.

During an operation of the axial flow machine, stress caused by collision with fluid such as bending stress or torsional stress is generated in a connecting portion between the endwall and the rotor blade and a connecting portion between the endwall and the stator vane. Further, stress caused by centrifugal force such as bending stress is further applied on the rotor blade. In order to suppress fatigue caused by this stress and prevent damage by this stress, a fillet is formed along the connecting portion between each airfoil and the endwall. The fillet is a curved surface extending from the airfoil to the endwall and smoothly connects surfaces of the airfoil and the endwall to each other (see Japanese Patent Laid-Open Publication No. 2014-109273).

SUMMARY

In order to withstand the stress described above, it is necessary to set the dimension (that is, a curvature radius) of a fillet to a large value to a certain extent. However, when the dimension of the fillet is excessively large, deterioration of secondary flow loss is caused by the fillet itself.

Therefore, it is an object of the present disclosure to provide an airfoil of an axial flow machine that includes a fillet capable of suppressing secondary flow loss while maintaining durability against stress such as bending stress.

An aspect of the present disclosure is a an airfoil of an axial flow machine comprising: an airfoil part that includes a pressure surface and a suction surface; an endwall as a shroud or a platform; and a fillet that is provided along a connecting portion between the airfoil part and the endwall and is formed as a curved surface extending from the airfoil part to the endwall, wherein the fillet includes a first curved surface and a second curved surface provided along the connecting portion, a curvature radius of the second curved surface is smaller than a curvature radius of the first curved surface, and the first curved surface is formed at least in respective portions of a leading edge side and a trailing edge side in the airfoil part on a suction surface side in a region where the fillet is formed, and the second curved surface is formed in a portion of the region other than a portion where the first curved surface is formed.

It is possible that, on the suction surface side in the region, the second curved surface is formed between the first curved surface on the leading edge side and the first curved surface on the trailing edge side.

It is possible that the first curved surface is continuously formed from a leading edge to a trailing edge of the airfoil part on the suction surface side in the region.

It is possible that the first curved surface on the leading edge side extends to a pressure surface side in the region via a leading edge of the airfoil part to connect with the second curved surface, and the first curved surface on the trailing edge side extends to the pressure surface side in the region via a trailing edge of the airfoil part to connect with the second curved surface.

It is possible that the first curved surface on the leading edge side connects with the second curved surface within a range of 10% of a chord length of the airfoil part from the leading edge on a pressure surface side in the region, and the first curved surface on the trailing edge side connects with the second curved surface within a range of 10% of the chord length of the airfoil part from the trailing edge on the pressure surface side in the region.

It is possible that the airfoil is a stator vane, and in this case, the fillet is provided along a connecting portion between the airfoil part and the endwall as the shroud.

Advantageous Effects of Invention

According to the present disclosure, it is possible to provide an airfoil of an axial flow machine that includes a fillet capable of suppressing secondary flow loss while maintaining durability against stress such as bending stress.

DESCRIPTION OF THE EMBODIMENTS

An airfoil of an axial flow machine according to an embodiment of the present disclosure will be described below with reference to the drawings. In the descriptions of the drawings, like parts are denoted by like reference signs and redundant explanations thereof will be omitted. The axial flow machine according to the present embodiment is an axial flow turbine or a compressor. The airfoil according the present embodiment is a rotor blade or a stator vane of an axial flow turbine or a compressor. A rotor blade is exemplified in the following descriptions.

Examples of an engine mounted with the axial flow machine according to the present embodiment include a turbofan engine, a turbojet engine, a turboprop engine, a turboshaft engine, and a turbo ramjet engine for airplanes, a gas turbine engine for power generation, and a gas turbine engine for ships. A turbofan engine is exemplified in the following descriptions.

Figure 1:
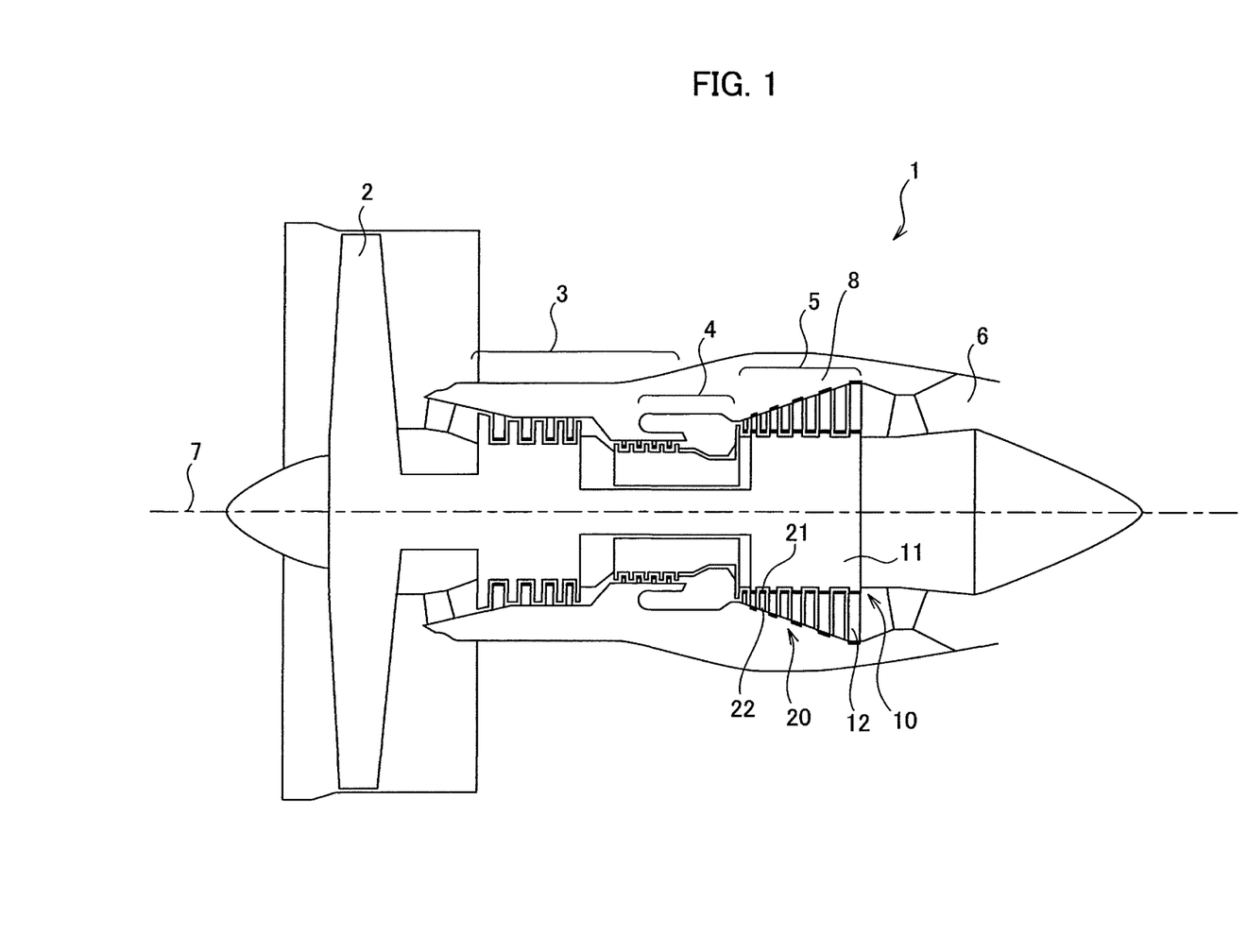
FIG. 1 is a cross-sectional diagram illustrating a gas turbine engine (a turbofan engine) including an axial flow machine according to an embodiment of the present disclosure.

As illustrated in FIG. 1, a turbofan engine 1 includes a fan 2, a compressor 3, a combustion chamber 4, and a turbine 5. The basic configuration and operation of the turbofan engine 1 (that is, compression of fluid, combustion, conversion from pressure energy to kinetic (rotational) energy, and the like) are the same as those in a conventional turbofan engine. That is, the compressor 3 compresses fluid sucked by the fan 2 (working fluid, air in the present embodiment), and the combustion chamber 4 burns mixed gas of the fluid compressed by the compressor 3 and fuel. The turbine 5 converts pressure energy of expanding combustion gas to rotational energy for a rotor 10 in the turbine 5 to drive the fan 2 and the compressor 3, and discharges the combustion gas from an exhaust duct 6. The compressor 3 may be a multishaft type in which it is divided into a plurality of compressors in accordance with the pressure of fluid. This is also the same for the turbine 5.

The turbine 5 includes the rotor 10 and a stator 20 that are alternately arranged along a rotation central axis 7. The rotor 10 is accommodated in a tubular casing 8 to be rotatable, and includes a plurality of rotor blades (blades) 12 that configure a rotor blade cascade and a rotating body (a disk or a drum) 11 that supports the rotor blades 12 and rotates integrally with the rotor blades 12 about the rotation central axis 7 as an axis of center. The rotor blades 12 are arranged radially around the rotation central axis 7 of the rotating body 11 as its center.

The stator 20 is accommodated in the casing 8, and includes a plurality of stator vanes (vanes) 22 that configure a stator vane cascade and an annular vane supporting body 21 provided on a hub side of the stator vanes 22. Similarly to the rotor blades 12, the stator vanes 22 are also arranged radially around the rotation central axis 7 of the rotating body 11 as its center. A tip side of each stator vane 22 is fixed to an inner surface of the casing 8.

Figure 2:
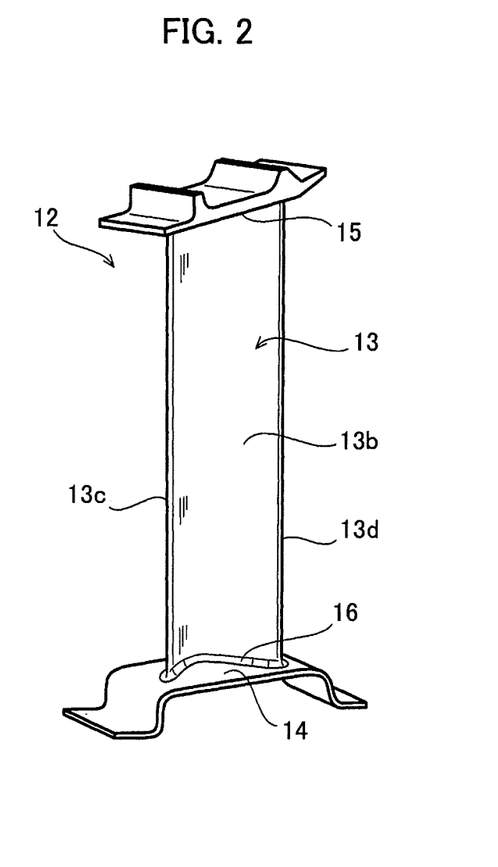
FIG. 2 is a diagram illustrating a rotor blade according to the embodiment of the present disclosure.

As illustrated in FIG. 2, the rotor blade 12 includes an airfoil part (airfoil section) 13. The airfoil part 13 includes a suction surface (a suction side) 13a (see FIG. 4), a pressure surface (a pressure side) 13b, a leading edge 13c, and a trailing edge 13d, and extends outward in a radial direction of the rotation central axis 7.

The rotor blade 12 includes a platform 14 provided on a hub side of the airfoil part 13 and a shroud 15 provided on a tip side of the airfoil part 13. Both the platform 14 and the shroud 15 are walls that section a flow path for fluid together with the airfoil part 13, that is, endwalls.

The rotor blade 12 includes fillets 16 that are provided along a connecting portion between the airfoil part 13 and the shroud 15 and along a connecting portion between the airfoil part 13 and the platform 14. The fillet 16 is formed as a curved surface that extends from the airfoil part 13 to the shroud 15 and the platform 14 respectively. This curved surface smoothly connects a surface of the airfoil part 13 and each of surfaces of the shroud 15 and the platform 14 to each other.

Figure 3:
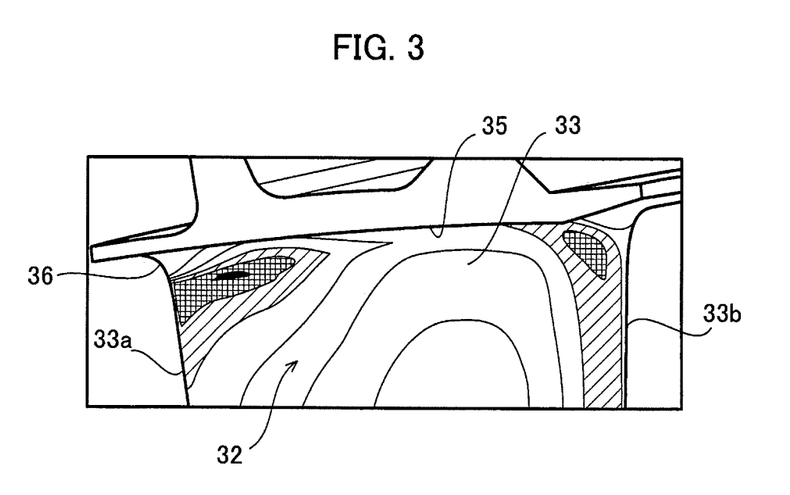
FIG. 3 illustrates a result of analysis that represents a stress distribution in the rotor blade including a fillet.

The fillet 16 distributes stress generated around the connecting portion between the shroud 15 and the airfoil part 13 and around the connecting portion between the platform 14 and the airfoil part 13, and suppresses fatigue and generation of a crack. An example of a result of analysis of this stress is illustrated in FIG. 3. FIG. 3 illustrates a result of analysis that represents a stress distribution when centrifugal force is applied to a rotor blade 32 including a fillet 36. A hatched portion in this stress distribution represents that stress in the hatched portion is relatively higher than in a portion therearound. Further, as hatching is thicker, stress is higher. It is understood from FIG. 3 that stress is generated along a connecting portion of an airfoil part 33 with a shroud 35 (in other words, along the fillet 36). Further, this stress concentrates on a leading edge 33a side and a trailing edge 33b side in the airfoil part 33, and is relatively low in a portion therebetween (a central portion). Also, stress having a similar distribution as that in the analysis result illustrated in FIG. 3 is generated near a connecting portion between the airfoil part 33 and a platform (not illustrated).

In order to distribute local stress illustrated in FIG. 3, it is effective to set the dimension (that is, a curvature radius) of a fillet to a large value. However, increase of the dimension of a fillet causes change of a cross-sectional shape of a flow path at that portion, promoting generation of a secondary flow. The secondary flow is generated near an endwall (that is, the platform 14 or the shroud 15) at the leading edge 13c of the airfoil part 13. This secondary flow travels substantially along the endwall to reach the suction surface 13a of the airfoil part 13 in an adjacent rotor blade 12, while being diffused. Thereafter, the secondary flow travels along the suction surface 13a on the adjacent rotor blade 12 toward the trailing edge 13d, and flows out rearwards. Because the secondary flow has a flow component of which direction is different from that of an original flow of fluid, the secondary flow generates vortex accompanied with pressure loss and causes the vortex to intensify.

That is, the increase of the dimension of a fillet increases loss such as pressure loss, while promoting distribution of stress to reinforce a rotor blade. Therefore, the fillet 16 according to the present embodiment focuses on localization of stress and has a configuration considering the above conflicting effects. More specifically, a value required for distributing (relaxing) stress is calculated with respect to a curvature radius of the fillet 16. Thereafter, for a portion of the fillet 16, which has small contribution to distribution (relaxation) of stress, a curvature radius is set to a value smaller than the above calculated value. In other words, a fillet with a large curvature radius is formed only in a portion where stress can be easily generated, and a fillet with a small curvature radius is formed in other portions.

Based on the above consideration, the fillet 16 according to the present embodiment includes a first curved surface 16a and a second curved surface 16b that are provided along a connecting portion between the airfoil part 13 and an endwall (that is, the platform 14 or the shroud 15). A curvature radius Rb of the second curved surface 16b is smaller than a curvature radius Ra of the first curved surface 16a (see FIGS. 5A and 5B).

The first curved surface 16a is formed in at least a portion of a region 17 where the fillet 16 is formed. This portion in the region 17 is close to a portion of the airfoil part 13 where relatively high stress is generated, and has a low possibility of affecting secondary flow loss. That is, from the analysis result in FIG. 3, portions on the leading edge 13c side and the trailing edge 13d side in the airfoil part 13 can be considered as candidates in which the first curved surface 16a is formed. Further, considering the effect on the secondary flow loss, at least a portion on the suction surface 13a side in the above portions is the most appropriate portion for formation of the first curved surface 16a. Here, the portion on the leading edge 13c side is a region that includes at least a portion in contact with the leading edge 13c. Similarly, the portion on the trailing edge 13d side is a region that includes at least a portion in contact with the trailing edge 13d.

Meanwhile, the second curved surface 16b is formed in a portion in the region 17 other than the portion in which the first curved surface 16a is formed. The portion in which the second curved surface 16b is formed is a portion that has a high possibility of mainly affecting secondary flow loss and has small contribution to distribution of stress, for example, a portion on the pressure surface 13b side and a portion between the leading edge 13c and the trailing edge 13d on the suction surface 13a side in the region 17. The portion between the leading edge 13c and the trailing edge 13d on the suction surface 13a side is a region on the suction surface 13a side between the first curved surface 16a on the leading edge 13c side and the first curved surface 16a on the trailing edge 13d side.

That is, while the fillet 16 contributes to distribution of stress as a whole, the first curved surface 16a thereof relaxes stress that is locally high and the second curved surface 16b thereof suppresses secondary flow loss generated in the entire fillet 16.

Figure 4:
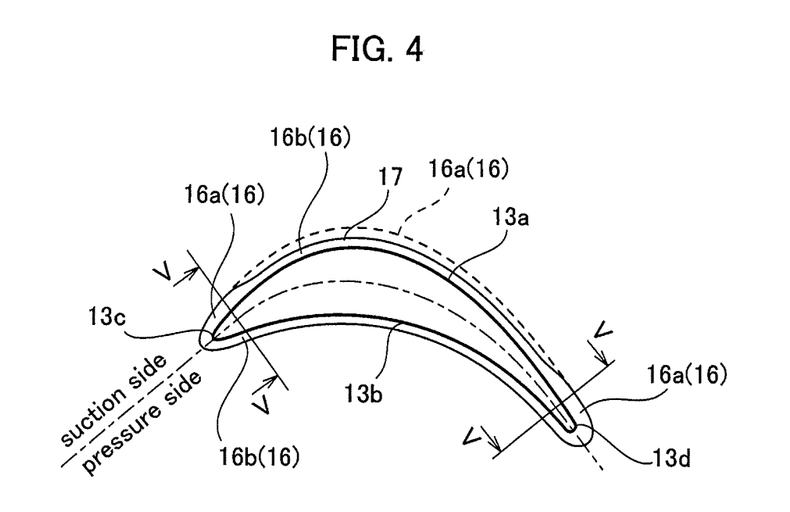
FIG. 4 is a diagram illustrating a formation position of the fillet according to the embodiment of the present disclosure.
Figure 5A:
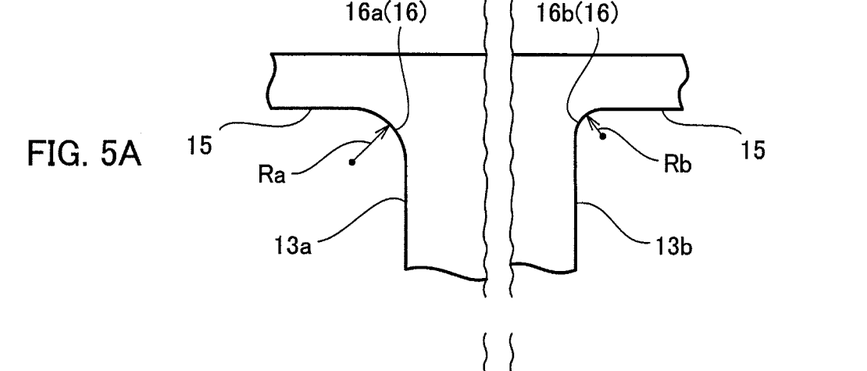
FIG. 5A is a cross-sectional diagram on the side of a shroud of the fillet taken along a line V-V in FIG. 4.
Figure 5B:
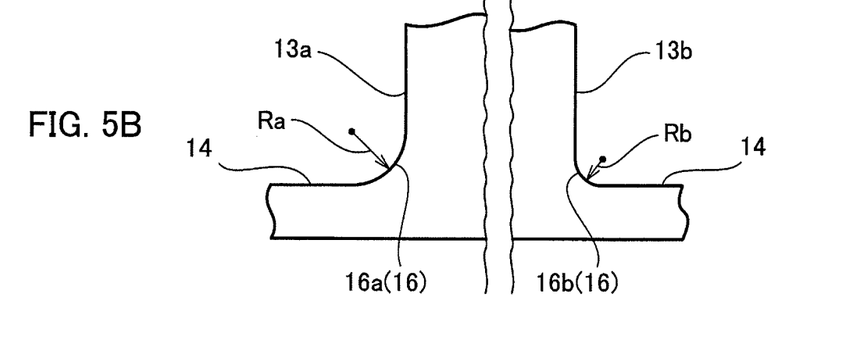
FIG. 5B is a cross-sectional diagram on the side of a platform of the fillet taken along a line V-V in FIG. 4.

For example, as illustrated in FIGS. 4, 5A, and 5B, the first curved surface 16a is formed on the leading edge 13c side and the trailing edge 13d side on the suction surface 13a side in the region 17, and the second curved surface 16b is formed in a portion on the suction surface 13a side in the region 17, in which the first curved surface 16a is not formed (that is, between two first curved surfaces 16a). Further, the second curved surface 16b is formed entirely on the pressure surface 13b side in the region 17 (that is, from the leading edge 13c to the trailing edge 13d). In addition, the curvature radius Rb of the second curved surface 16b is smaller than the curvature radius Ra of the first curved surface 16a.

The curvature radius Ra of the first curved surface 16a may be constant along a connecting portion or may change gradually. Similarly, the curvature radius Rb of the second curved surface 16b may be constant along a connecting portion or may change gradually. However, a curvature radius of the fillet 16 changes to allow smooth connection of the first curved surface 16a and the second curved surface 16b to each other at a boundary between the first curved surface 16a and the second curved surface 16b.

On a plane perpendicular to a centerline of the airfoil part 13, the curvature radius Ra and the curvature radius Rb may be constant or may change gradually. However, even the maximum value of the curvature radius Ra of the first curved surface 16a is about several millimeters at most. Therefore, even in a case where the first curved surface 16a and the second curved surface 16b each include a curve, for example, an ellipse or a parabola on the plane perpendicular to the center line of the airfoil part 13, the curve can be approximated by an arc with a constant curvature radius.

When the rotor blade (the stator vane) according to the present embodiment is applied to a low-pressure turbine of a jet engine, the curvature radius Ra of the first curved surface 16a is set to 1.5 to 3 mm, for example. Meanwhile, the curvature radius Rb of the second curved surface 16b is set to 1 to 2 mm, for example. An upper limit of the curvature radius Ra and an upper limit and a lower limit of the curvature radius Rb are not limited to the above values, but are changed in accordance with the type of a device to which the rotor blade (the stator vane) according to the present embodiment is applied, a value required in casting of the rotor blade (the stator vane), desired durability against stress, and an allowance of secondary flow loss.

Figure 6:
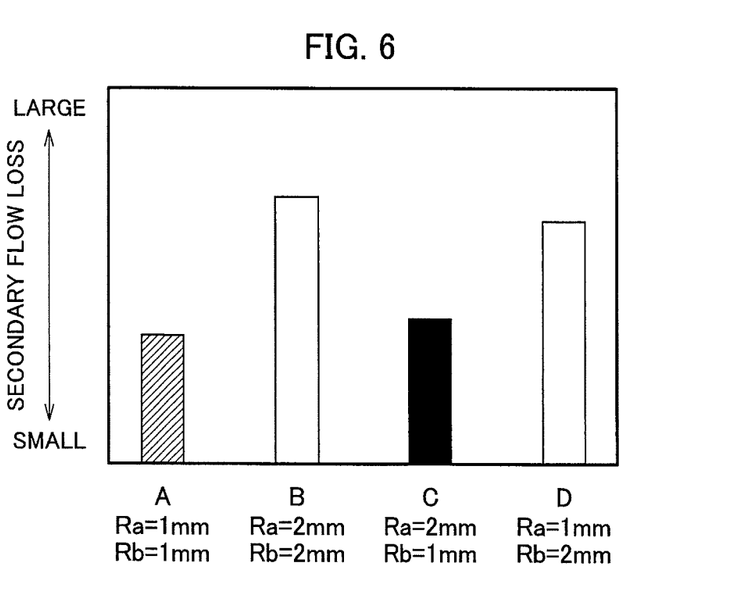
FIG. 6 is a graph representing a result of analysis of secondary flow loss in a stator vane when a curvature radius of a fillet is changed.

FIG. 6 is a graph of representing a result of analysis of secondary flow loss in a stator vane when the curvature radius Ra of the first curved surface 16a and the curvature radius Rb of the second curved surface 16b are changed. This analysis result uses secondary flow loss in a stator vane without a fillet as a reference. In other words, FIG. 6 represents a level of secondary flow loss caused by formation of a fillet and levels of secondary flow loss when a curvature radius of the fillet is changed depending on its formation position. The tendency of secondary flow loss represented by this analysis result is the same as in a case where analysis is performed for a rotor blade.

All stator vanes of samples A to D are the same in the shape of an endwall and the shape of an airfoil part. Specifically, the first curved surface 16a is formed on the suction surface 13a side entirely, and the second curved surface 16b is formed on the pressure surface 13b side entirely (that is, from the leading edge 13c side to the trailing edge 13d side). However, in the stator vane of the sample A, both the curvature radius Ra of the first curved surface 16a and the curvature radius Rb of the second curved surface 16b are set to 1 mm, and in the stator vane of the sample B, both the curvature radius Ra and the curvature radius Rb are set to 2 mm. In the stator vane of the sample C, the curvature radius Ra is set to 2 mm, and the curvature radius Rb is set to 1 mm. In the stator vane of the sample D, the curvature radius Ra is set to 1 mm and the curvature radius Rb is set to 2 mm. That is, the stator vane according to the present embodiment is only the sample C.

As is understood from FIG. 6, secondary flow loss is deteriorated in all the samples because of formation of a fillet. Further, from comparison between the samples A and B, it is understood that, as a curvature radius of a fillet is larger, secondary flow loss is more deteriorated. Furthermore, from an analysis result of the sample D, it is understood that, when the curvature radius of the fillet is larger on the pressure surface 13b side than on the suction surface 13a side, loss is generated at the same or approximately the same level as that in a case where a fillet with the same curvature radius as that of the fillet on the pressure surface 13b side is formed over the entire circumference of the airfoil part 13 (see the sample B).

However, secondary flow loss of the sample C according to the present embodiment is smaller than that of the sample B, irrespective of inclusion of a fillet having the same curvature radius as that of the sample B on the suction surface 13a side. Further, secondary flow loss of the sample C corresponds to secondary flow loss of the sample A, irrespective of inclusion of a fillet having a larger curvature radius than that of the sample A on the suction surface 13a side.

As described above, by providing as the fillet 16 the first curved surface 16a on the suction surface 13a side and the second curved surface 16b having a smaller curvature radius than the first curved surface 16a on the pressure surface 13b side, it is possible to suppress secondary flow loss on the rotor blade 12 to a similar value to that in a case where the second curved surface 16b is formed over the entire circumference of a connecting portion of the airfoil part 13 and an endwall. That is, it is possible to provide an airfoil that can suppress loss caused by a secondary flow, while maintaining durability against stress such as bending stress by formation of a fillet.

As illustrated with a dotted line in FIG. 4, the first curved surface 16a may be continuously formed from the leading edge 13c to the trailing edge 13d on the suction surface 13a side in the region 17. Further, in accordance with a use environment that is set, the first curved surfaces 16a may be formed on the leading edge 13c side and the trailing edge 13d side on the suction surface 13a side in the region 17 to be away from each other. The latter mode can be applied to a case where sufficient relaxation of stress can be achieved without providing the first curved surface 16a. Between two first curved surfaces 16a, a curved surface is formed which has a smaller curvature radius than the first curved surface 16a (for example, the same curved surface as the second curved surface 16b formed on the pressure surface 13b side). Also in this case, an analysis result similar to that of the sample C in FIG. 6 has been obtained, and the advantageous effects described above are achieved.

Further, the first curved surface 16a on the leading edge 13c side may extend to the pressure surface 13b side in the region 17 via the leading edge 13c and connect with the second curved surface 16b, while the first curved surface 16a on the trailing edge 13d side may extend to the pressure surface 13b side in the region 17 via the trailing edge 13d and connect with the second curved surface 16b. In this case, reinforcement of the leading edge 13c and the trailing edge 13d can be promoted. However, it is apparent from the analysis result in FIG. 6 that excessive extension of the first curved surface 16a on the pressure surface 13b side deteriorates secondary flow loss. Therefore, even in a case where the first curved surface 16a on the leading edge 13c side extends to the pressure surface 13b side, its end is located within a range of about 10% at most of a chord length of the airfoil part 13 from a tip of the leading edge 13c. In other words, the first curved surface 16a on the leading edge 13c side connects with the second curved surface 16b within a range of about 10% of the chord length of the airfoil part 13 from the tip of the leading edge 13c on the pressure surface 13b side. Similarly, even in a case where the first curved surface 16a on the trailing edge 13d side extends to the pressure surface 13b side, its end is located within a range of about 10% of the chord length of the airfoil part 13 from a tip of the trailing edge 13d. In other words, the first curved surface 16a on the trailing edge 13d side connects with the second curved surface 16b within a range of about 10% of the chord length of the airfoil part 13 from the tip of the trailing edge 13d on the pressure surface 13b side. For example, this end is located within a range from the trailing edge 13d to a boundary of the pressure surface 13b. For example, assuming that an outline of the trailing edge 13d is defined as an arc, this boundary is located between this arc and a curved surface defining the pressure surface 13b.

As described above, the tendency of secondary flow loss when a curvature radius is changed (see FIG. 3) is observed on both a rotor blade and a stator vane and, in particular, is significant at an end of an airfoil at which the amount of leaking flow of fluid from an upstream clearance (a space between an endwall and a casing) is large. That is, a fillet according to the present embodiment can be provided on a hub side and a tip side of a rotor blade and a hub side and a tip side of a stator vane and, when being provided on the tip side of the stator vane (in other words, when the fillet is provided along a connecting portion between an airfoil part and a shroud), can distribute (relax) stress while suppressing secondary flow loss most effectively.

The present disclosure is not limited to the embodiment described above. That is, addition, omission, replacement, and other modifications of the configurations can be made without departing from the spirit of the present disclosure. For example, the rotor blade may be a rotor blade without a shroud.

What is claimed is:

1. An airfoil of an axial flow machine comprising:
    an airfoil part that includes a pressure surface and a suction surface;
    an endwall as a shroud or a platform; and
    a fillet that is provided along a connecting portion between the airfoil part and the endwall and is formed as a curved surface extending from the airfoil part to the endwall, wherein
    the fillet includes a first curved surface and a second curved surface arranged in series around the airfoil part and along the connecting portion,
    a curvature radius of the second curved surface is smaller than a curvature radius of the first curved surface, and
    the first curved surface is formed at least in respective portions on a leading edge side and a trailing edge side of the airfoil part on a suction surface side of the airfoil part in a region where the fillet is formed, and the second curved surface is formed in a portion of the region other than portions of the region where the first curved surface is formed.

2. The airfoil of an axial flow machine according to claim 1, wherein on the suction surface side in the region, the second curved surface is formed between the first curved surface on the leading edge side and the first curved surface on the trailing edge side.

3. The airfoil of an axial flow machine according to claim 1, wherein the first curved surface is continuously formed from a leading edge to a trailing edge of the airfoil part on the suction surface side in the region.

4. The airfoil of an axial flow machine according to claim 1, wherein
    the first curved surface on the leading edge side extends to a pressure surface side in the region via a leading edge of the airfoil part to connect with the second curved surface, and
    the first curved surface on the trailing edge side extends to the pressure surface side in the region via a trailing edge of the airfoil part to connect with the second curved surface.

5. The airfoil of an axial flow machine according to claim 2, wherein
    the first curved surface on the leading edge side extends to a pressure surface side in the region via a leading edge of the airfoil part to connect with the second curved surface, and
    the first curved surface on the trailing edge side extends to the pressure surface side in the region via a trailing edge of the airfoil part to connect with the second curved surface.

6. The airfoil of an axial flow machine according to claim 3, wherein
    the first curved surface on the leading edge side extends to a pressure surface side in the region via a leading edge of the airfoil part to connect with the second curved surface, and
    the first curved surface on the trailing edge side extends to the pressure surface side in the region via a trailing edge of the airfoil part to connect with the second curved surface.

7. The airfoil of an axial flow machine according to claim 4, wherein
    the first curved surface on the leading edge side connects with the second curved surface within a range of 10% of a chord length of the airfoil part from the leading edge on a pressure surface side in the region, and the first curved surface on the trailing edge side connects with the second curved surface within a range of 10% of the chord length of the airfoil part from the trailing edge on the pressure surface side in the region.

8. The airfoil of an axial flow machine according to claim 5, wherein the first curved surface on the leading edge side connects with the second curved surface within a range of 10% of a chord length of the airfoil part from the leading edge on a pressure surface side in the region, and the first curved surface on the trailing edge side connects with the second curved surface within a range of 10% of the chord length of the airfoil part from the trailing edge on the pressure surface side in the region.

9. The airfoil of an axial flow machine according to claim 6, wherein the first curved surface on the leading edge side connects with the second curved surface within a range of 10% of a chord length of the airfoil part from the leading edge on a pressure surface side in the region, and the first curved surface on the trailing edge side connects with the second curved surface within a range of 10% of the chord length of the airfoil part from the trailing edge on the pressure surface side in the region.

10. The airfoil of an axial flow machine according to claim 1, wherein the airfoil is a stator vane, and the fillet is provided along a connecting portion between the airfoil part and the endwall as the shroud.

11. The airfoil of an axial flow machine according to claim 2, wherein the airfoil is a stator vane, and the fillet is provided along a connecting portion between the airfoil part and the endwall as the shroud.

12. The airfoil of an axial flow machine according to claim 3, wherein the airfoil is a stator vane, and the fillet is provided along a connecting portion between the airfoil part and the endwall as the shroud.

13. The airfoil of an axial flow machine according to claim 4, wherein the airfoil is a stator vane, and the fillet is provided along a connecting portion between the airfoil part and the endwall as the shroud.

14. The airfoil of an axial flow machine according to claim 5, wherein the airfoil is a stator vane, and the fillet is provided along a connecting portion between the airfoil part and the endwall as the shroud.

15. The airfoil of an axial flow machine according to claim 6, wherein the airfoil is a stator vane, and the fillet is provided along a connecting portion between the airfoil part and the endwall as the shroud.

16. The airfoil of an axial flow machine according to claim 7, wherein the airfoil is a stator vane, and the fillet is provided along a connecting portion between the airfoil part and the endwall as the shroud.

17. The airfoil of an axial flow machine according to claim 8, wherein the airfoil is a stator vane, and the fillet is provided along a connecting portion between the airfoil part and the endwall as the shroud.

18. The airfoil of an axial flow machine according to claim 9, wherein the airfoil is a stator vane, and the fillet is provided along a connecting portion between the airfoil part and the endwall as the shroud.

19. The airfoil of an axial flow machine according to claim 1, wherein the curvature radius of the first curved surface on the plane perpendicular to the center line of the airfoil part has a value approximated for the first curved surface by an arc with a constant curvature radius on the plane perpendicular to the center line of the airfoil part, and the curvature radius of the second curved surface on the plane perpendicular to the center line of the airfoil part has a value approximated for the second curved surface by an arc with a constant curvature radius on the plane perpendicular to the center line of the airfoil part.

* * * * *